(12) United States Patent
Schuetzle et al.

(10) Patent No.: US 12,060,531 B1
(45) Date of Patent: Aug. 13, 2024

(54) PRODUCTION OF FUELS FROM HYDROPROCESSED ESTERS AND FATTY ACIDS, LOW CARBON HYDROGEN, AND CARBON DIOXIDE IN AN INTEGRATED HEFA AND EFUELS PLANT

(71) Applicant: Infinium Technology, LLC, Sacramento, CA (US)

(72) Inventors: Robert Schuetzle, Sacramento, CA (US); Harold Wright, Menomonee Falls, WI (US); Benjamin Wright, Brookfield, WI (US)

(73) Assignee: Infinium Technology, LLC, Sacramento, CA (US)

( * ) Notice: Subject to any disclaimer, the term of this patent is extended or adjusted under 35 U.S.C. 154(b) by 0 days.

(21) Appl. No.: 18/445,055

(22) Filed: Mar. 22, 2023

(51) Int. Cl.
C10G 65/04 (2006.01)

(52) U.S. Cl.
CPC .... *C10G 65/043* (2013.01); *C10G 2300/1011* (2013.01); *C10G 2300/4081* (2013.01); *C10G 2300/70* (2013.01)

(58) Field of Classification Search
CPC ............... C10G 65/04; C10G 65/043; C10G 2300/1011; C10G 2300/4081; C10G 2300/70
See application file for complete search history.

(56) References Cited

U.S. PATENT DOCUMENTS

| | | | |
|---|---|---|---|
| 11,655,551 B2 * | 5/2023 | Rouveyre | C25B 11/036 205/344 |
| 2006/0053792 A1 * | 3/2006 | Bourgeois | C25B 1/04 60/670 |
| 2016/0017800 A1 * | 1/2016 | Simpson | C25B 1/04 422/162 |
| 2021/0340015 A1 | 11/2021 | Schuetzle et al. | |

FOREIGN PATENT DOCUMENTS

WO WO-2018144965 A1 * 8/2018 ............. A01G 18/20

* cited by examiner

*Primary Examiner* — Ellen M McAvoy
*Assistant Examiner* — Chantel Graham

(57) ABSTRACT

An integrated facility to produce either renewable diesel fuel or sustainable aviation fuel, or both renewable diesel and sustainable aviation fuel from carbon dioxide including carbon dioxide that is a byproduct of reacting Hydroprocessed Esters and Fatty Acids (HEFA) and hydrogen that produces renewable fuels. HEFA is hydroprocessed to produce a liquid fuel product and may produce water, CO and water, or $CO_2$. Integrated with an eFuels process that produces the hydrogen that is needed in various steps of the integrated process. Renewable or low carbon electricity is used to convert water to hydrogen and oxygen in an electrolyzer. Carbon dioxide is reacted with at least a portion of the hydrogen to produce a stream comprising carbon monoxide with a carbon dioxide conversion per pass of between 50% to 100%, preferably between 60% and 100%, and more preferably between 70% and 100%.

22 Claims, 5 Drawing Sheets

FIG. 5

PRODUCTION OF FUELS FROM HYDROPROCESSED ESTERS AND FATTY ACIDS, LOW CARBON HYDROGEN, AND CARBON DIOXIDE IN AN INTEGRATED HEFA AND EFUELS PLANT

FIELD OF THE INVENTION

The field of the invention is a process to produce either or both synthetic jet fuel and synthetic diesel fuel from the integration of plants that hydroprocess esters and fatty acids, low carbon hydrogen production, and eFuels production processes.

BACKGROUND OF THE INVENTION

The increase in global atmospheric carbon dioxide concentrations has been linked to changes in the earth's climate. The combustion of fossil fuels in various engines produces atmospheric carbon dioxide. Concerns about climate change have led to significant societal changes toward renewable energy and fuels. This has also led to increasing activity to decarbonize the transport sector of the economy. As a result, we see increases in the use of electric vehicles that are powered by renewable electricity to aid in decarbonization of the transport sector. However, electrification of vehicle fleets has limitations. Large vehicles that are used for heavy transport are expensive and, in some cases, not possible to electrify. Long haul trucks, marine vehicles, locomotives used for rail transport, currently are challenging to electrify and switch over costs for these fleets as well as development of charging infrastructure carries extraordinary costs and could take decades. Efficient and economical production of low carbon diesel for long haul, maritime, rail and other heavy transportation uses could lead to significant reductions in the carbon dioxide emissions in these sectors.

In addition, aviation is one of the most carbon intensive transportation sectors and accounts for more than two percent of global carbon dioxide emissions. The consumption of jet fuel produced from petroleum, a fossil fuel, by the aviation sector is a significant fraction of the total transport carbon dioxide emissions. However, jet aircraft are unlikely to be electrified in the near future. Efficient and economical production sustainable aviation fuel (SAF) could lead to significant reductions in the carbon dioxide emissions by the aviation sector.

Jet engines are complex technological devices that have been optimized over 70 years to operate on petroleum derived jet fuel. Global standards have been developed regarding the properties of jet fuel. ASTM D1655 is the U.S. standard for petroleum derived jet fuel. Starting in 2009, another standard has been developed for jet fuel or jet fuel components that are not derived from petroleum. ASTM D7566-21 (Reference 1) is the current standard specification for aviation turbine fuel containing synthesized hydrocarbons (not from petroleum).

A trend in focusing on decarbonization is around the production and use of Renewable Fuels of Non-Biological Origin (or RFNBOs). RFNBOs are fuels that are produced from non-biological sources, such as electricity, hydrogen, and carbon dioxide. These fuels are considered renewable because they are produced from sources that are not depleted. Unlike biofuels, which are produced from crops such as corn, sugarcane, and soybeans, RFNBOs do not compete with food resources. The production of biofuels has been criticized for contributing to food shortages and driving up food prices. In contrast, RFNBOs do not require any agricultural land or resources, making them a sustainable alternative to traditional fuels.

RFNBOs are seen as a promising alternative to traditional fossil fuels and fuels produced from products that can compete with food sources, as they offer a sustainable and environmentally friendly option for meeting our energy needs.

Over the last 10 years, renewable diesel has been produced from Hydroprocessed Esters and Fatty Acids (HEFA) and nearly chemically identical to jet or diesel fuel produced from Fischer-Tropsch (F-T) type processes. Fats, oils, and greases from vegetable oil, animal fats, tallow, etc. are fatty acids that can be converted to renewable diesel or jet fuel. HEFA, also called Hydroprocessed Vegetable OIL (or HVO), involved the conversion of Hydroprocessed Esters and Fatty Acids (HEFA), which includes use of a wide variety of vegetable oils and fats, to fuels can be done by taking three different routes. First is decarboxylation (DCOX). Using a DCOX reaction scheme, the HEFA is converted to a hydrocarbon and carbon dioxide. The second route is decarbonylation (DCON). Using a DCON reaction scheme, hydrogen is added to the HEFA and is converted to a hydrocarbon plus water and carbon monoxide. The third route is hydrodeoxygenation (HDO). Using a HDO reaction scheme, hydrogen is added to the HEFA and is converted to a hydrocarbon plus water. All three routes can be used to ultimately produce renewable fuels. All three routes produce light gases (C1-C4) in some amounts in addition to the primary products.

The catalytic hydrogenation of carbon monoxide to produce light gases, liquids, and waxes, ranging from methane to heavy hydrocarbons (C100 and higher) in addition to oxygenated hydrocarbons, is typically referred to Fischer-Tropsch (or F-T) synthesis. One of the routes for production of non-petroleum based synthesized paraffinic kerosene (SPK) allowed by ASTM D7566 is the fuel derived from the Fischer-Tropsch process. Traditional low temperature (<250° C.) F-T processes primarily produce a high weight (or wt. %) F-T wax ($C_{24}$ and higher) from the catalytic conversion process. These F-T waxes are then hydrocracked and/or further processed to produce diesel, naphtha, and other fractions. During this hydrocracking process, light hydrocarbons are also produced. In some embodiments, these light hydrocarbons require additional upgrading to produce viable products. The catalysts that are commonly used for F-T comprise Cobalt (Co) based, or Iron (Fe) based catalysts.

An advanced alternative to traditional F-T processes is called Direct Liquid Fuel Production (Direct LFP), whereby liquid fuels are produced with high selectivity without first producing a wax product. This Direct LFP process eliminates the major capital-intensive process of hydrocracking. The directly produced liquid fuels have a high percentage of n-paraffins. In this invention, light hydroisomerization converts the n-alkanes to iso-paraffins which have cold flow properties that can meet aviation fuel specification requirements.

This invention overcomes an issue with previous art that describes blending F-T straight run and concentrates on direct liquid fuel production and light processing via hydroisomerization, thereby overcoming the issues of blending straight run F-T kerosene into the SPK.

eFuels or electrofuels refers to the production of synthetic fuels from waste CO2 that would otherwise be emitted to the atmosphere and low carbon hydrogen, traditionally produced from renewable power that is used to produce hydrogen using electrolysis. F-T processes or the Direct LFP process described above can be used in the production of fuels in an eFuels process.

The current invention is a process to produce synthesized paraffinic kerosine (SPK) blendstock that is used as a sustainable aviation fuel (SAF) and/or synthetic diesel from esters and fatty acids, low carbon hydrogen, and captured $CO_2$ in an integrated HEFA and eFuels plant.

BRIEF SUMMARY OF THE INVENTION

An integrated facility is described to produce either renewable diesel fuel or sustainable aviation fuel, or both renewable diesel and sustainable aviation fuel, from carbon dioxide from waste and/or CO2 from a byproduct of reacting Hydroprocessed Esters and Fatty Acids (HEFA) and hydrogen that produces renewable fuels. HEFA is hydroprocessed to produce a liquid fuel product and may produce water, CO and water, or CO2. During the HEFA production process that may involve DCOX, DCON, or DHO or combinations thereof. The light gases are produced that may range from C1-C4 or higher.

This invention describes a HEFA process that is integrated with an eFuels process that produces the low carbon hydrogen that is needed in various steps of the integrated process and is used to process carbon dioxide, carbon monoxide, water, and/or light gases produced from the HEFA process.

In one embodiment, the C1-C4 product gases of the HEFA reactor, can be used downstream. In one embodiment, the C1-C4 product gases are sent to the Reverse Water Gas Shift (RWGS) reactor that is used in the eFuels plant where the hydrocarbons are converted at some level to H2 and CO that can be used downstream in the LFP process or F-T process to produce additional hydrocarbon products.

In another embodiment, the C1-C4 product gases are sent to an electrically heated steam methane reformer (eSMR). In the eSMR tubes are filled with reforming catalyst comprising nickel. The tubes are placed in an electrically heated furnace that is used to heat the tubes and catalyst to reforming conditions in excess of 1400 F. The reaction equilibrium favors the production of H2 and CO from these light gases as temperature increases.

In one embodiment, the C1-C4 product gases are sent to an Autothermal. Reformer (ATR) unit. The ATR uses the oxygen from the electrolyzer as a feedstream. The ATR is an autothermal reaction where the oxygen combusts some of the hydrocarbon to fuels. In some embodiments, the ATR is integrated with a pre-reformer. In that case, all the hydrocarbons are converted to methane and/or CO and H2 prior to entering the main oxygen-blown reactor system.

In the eFuels process renewable or low carbon electricity is used to convert water to hydrogen and oxygen in an electrolyzer. Carbon dioxide is reacted with at least a portion of the hydrogen to produce a stream comprising carbon monoxide with a carbon-dioxide conversion per pass of between 50% to 100%, preferably between 60% and 100%, and more preferably between 70% and 100%.

At least a portion of the carbon monoxide produced is reacted with hydrogen in a Direct Liquid Fuel Production (LFP) reactor or traditional F-T reactor to produce a liquid product that comprises n-alkanes with carbon numbers from 5 to 24. Additional products are produced in the process including gases lighter than C5 and light wax/heavy diesel greater than C24, however these products are minimized in order to optimize the efficiency and economics of the integrated facility. The $C_9$ to $C_{15}$ fraction of the liquid product is between 40% and 100%, preferably between 45% and 100%, and more preferably between 50% and 100%. The LFP liquid product is further separated into three liquid streams in an LFP separation unit. The light LFP separation product stream comprises $C_5$ to $C_8$ n-alkanes; the medium LFP separation product stream comprises $C_9$-$C_{15}$ n-alkanes; the heavy LFP separation product stream comprises $C_{16}$-$C_{24}$ n-alkanes.

At least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is between −40° C. to −60° C. In one embodiment the freeze point is between −48° C. and −60° C. In one embodiment the freeze point is between −48° C. and −55° C. In some embodiments, the heavy hydroisomerization product is a synthesized paraffinic kerosene (SPK) that is used as a component in jet fuel.

In some embodiments of the invention, at least a portion of the light LFP separation unit product stream is fed to an oligomerization reactor to produce an oligomerization reactor product that comprises hydrocarbons with a carbon number from 9 to 15.

In some embodiments of the invention, the entire liquid product steam is first isomerized and then distilled after and whereby the isomerization not only performs isomerization but light cracking of the heavy LFP separation product stream.

In some embodiments of the invention, the carbon intensity (CI) of the produced SAF is between 0 and 30, preferably between 0 and 15, and more preferably between 0 and 5.

In some embodiments of the invention, further integration of the eFuels plant and the HEFA plant are performed in order to achieve (1) lower overall carbon intensity of the products (2) better economics due to the use of by-product streams (including light gases, CO2, CO, water, and waste heat or steam) from the HEFA plant as feedstocks and inputs to the eFuels plant and (3) the use of by-product CO2 that allows the fuels produced from this carbon source to be identified as Renewable Fuels of Non-Biological Origin (RFNBO).

The integrated process using HEFA and eFuels unit operations, including the hydrogen from electrolysis of water will result in a lower well to wheels carbon intensity lower than fuel produced by HEFA hydroprocessing alone.

DETAILED DESCRIPTION OF THE INVENTION

The traditional conversion of biomass feedstocks to Hydroprocessed Esters and Fatty Acids (HEFA) that can be used as renewable diesel or renewable jet can be done by taking three different routes. First is decarboxylation (DCOX). Using a DCOX reaction scheme, the HEFA is converted to a hydrocarbon and carbon dioxide. The second route is decarbonylation (DCON). Using a DCON reaction scheme, hydrogen is added to the HEFA and is-converted to a hydrocarbon plus water and carbon monoxide. The third route is hydrodeoxygenation (HDO). Using a HDO reaction scheme, hydrogen is added to the HEFA and is converted to a hydrocarbon plus water. All three routes can be used to ultimately produce renewable fuels. In some embodiments, one, two, or three of these routes or processes are performed in a singular hydroprocessing or hydroisomerization reactor.

DCOX or DCON reaction scheme

Figure 1:
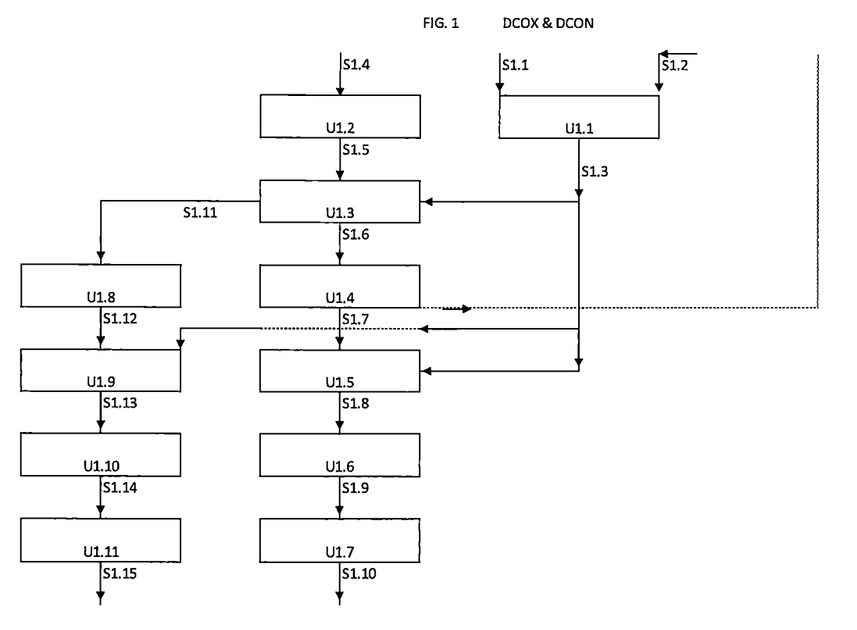
FIG. 1 shows the integrated process of hydroprocessing fatty acids via decarboxylation (DCOX) or decarbonylation (DCON) reaction using low-carbon hydrogen.

FIG. 1 shows an integrated process for the production of synthesized paraffinic kerosene or jet fuel and/or renewable diesel using either a DCOX or DCON reaction scheme. Stream S1.1 is low carbon electricity. Low carbon electricity includes but is not limited to wind power, solar power nuclear power, geothermal power, power generated from biomass or renewable natural gas, and hydropower. Feed stream S1.2 is water. These are fed to unit U1.1 which is the electrolyzer. In the electrolyzer, water and low carbon energy are used to produce hydrogen and oxygen. Water is fed to the electrolyzer. The electrolyzer is powered by low carbon electricity. Hydrogen is produced by electrolysis of water.

$$H_2O = H_2 + \frac{1}{2}O_2$$

Electrolyzers consist of an anode and a cathode separated by an electrolyte. Different electrolyzers function in slightly different ways. Different electrolyzer designs that use different electrolysis technology that are used include alkaline electrolysis, polymer electrolyte membrane (PEM) electrolysis, solid oxide electrolysis, high temperature electrolysis and other emerging types of electrolysis. Different electrolytes that are used including liquids KOH and NaOH, and with or without activating compounds. Activating compounds are added to the electrolyte to improve the stability of the electrolyte. Most ionic activators for the hydrogen evolution reaction are composed of an ethylenediamine-based metal chloride complex ([M(en)3]Clx,M¼Co, Ni, et al.) and $Na_2MoO_4$ or $Na_2WO_4$. Different electrocatalysts are used on the electrodes including many different combinations of metals and oxides like Raney-Nickel-Aluminum, which are enhanced by adding cobalt or molybdenum to the alloy.

The products from the electrolyzer are a stream comprising hydrogen called stream S1.3. Due to the use of renewable energy sources, the electrolyzer produces "green" hydrogen. Depending on the carbon-intensity of energy used in unit U1.1, other low carbon hydrogen streams are produced. Other forms of hydrogen generation that may use renewable or non-renewable energy sources may also be used, including methane pyrolysis, steam reforming with carbon capture, biomass gasification, renewable natural gas (RNG) reforming or sourcing hydrogen from geological sources where purification of the stream may be required to produce hydrogen for use in a process.

In FIG. 1, stream S1.4 which comprises the renewable animal and/or vegetable feedstock and includes materials such as seed oils, palm oils, corn oils, soybean oils, distillers corn oil, other virgin oils, and also includes waste oils, used cooking oils, tallow, methyl esters, Stream S1.4 is pretreated in unit U1.2. Unit U1.2 comprises multiple processes that are used depending on the feedstock use and the contaminants that are in the feedstocks. This includes acid degumming, adsorption, chloride removal, polyethylene removal, and caustic or deacidification processes.

The product of pretreating the HEFA is shown as stream S1.5 and is then sent to the hydrotreatment reactor, unit U1.3. Unit U1.3 is where the chosen reaction scheme takes place, either DCOX or DCON or HDO in FIG. 1. Green hydrogen from stream S1.3 is added to unit U1.3. Two separate hydrocarbons are produced in unit U1.3. First, both DCOX and DCON reaction schemes produce hydrocarbons and those hydrocarbons become stream S1.11. Second, an additional reaction is conducted in unit U1.3 to convert the carbon dioxide from a DCOX reaction to a hydrocarbon or convert the carbon monoxide from a DCON reaction to a hydrocarbon. This hydrocarbon becomes stream S1.6. Stream S1.6 is fed into unit U1.4, the separation unit. The product stream, S1.7 is the hydroisomerization feed stream for unit U1.5, the hydroisomerization reactor. The product stream, S1.8, is the hydroisomerization separation feed stream for unit U1.6, the hydroisomerization separation unit. The product stream, S1.9, the refining feed stream is fed into the refining unit, U1.7 and produces the product stream S1.10. Units U1.8, U1.9, U1.10, and U1.11 are the same as units U1.4, U1.5, U1.6, and U1.7, with the initial feed stream, S1.11 which is the hydrocarbon produced from the hydrotreatment reactor, U1.3.

Figure 2:
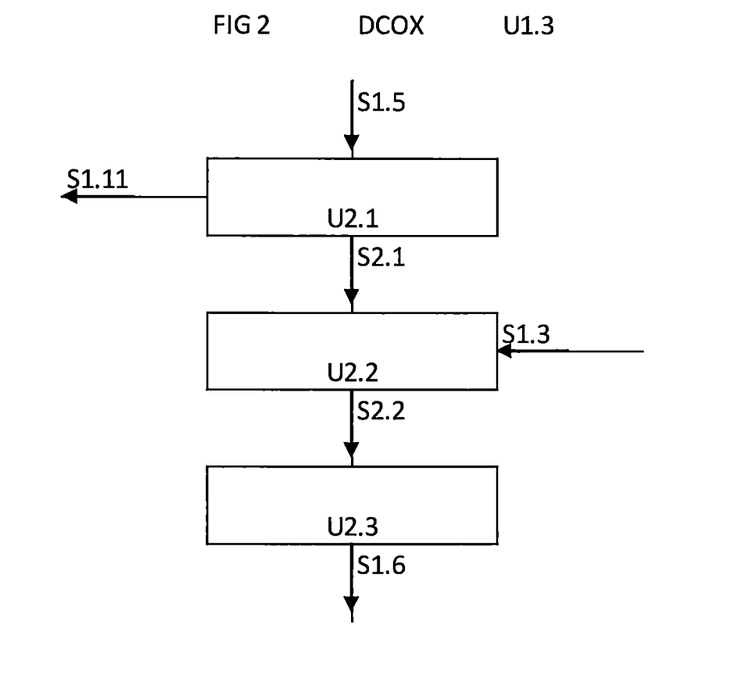
FIG. 2 shows an expanded look at the hydrotreatment reactor, unit U1.3, when utilizing a decarboxylation (DCOX) reaction scheme.
Figure 3:
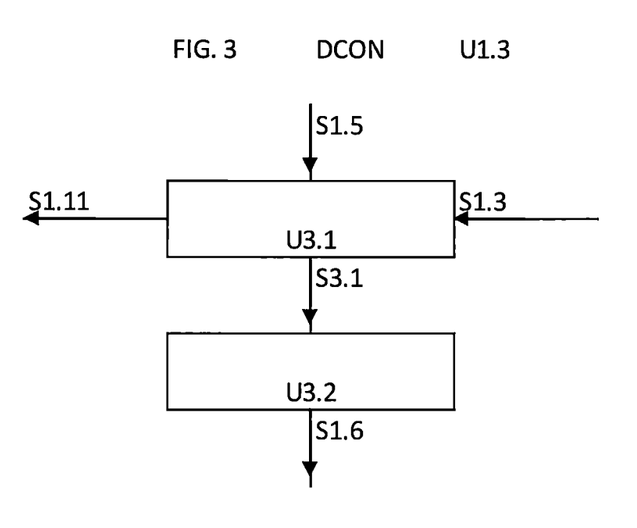
FIG. 3 shows an expanded look at the hydrotreatment reactor, unit U1.3, when utilizing a decarbonylation (DCON) reaction scheme.
Figure 4:
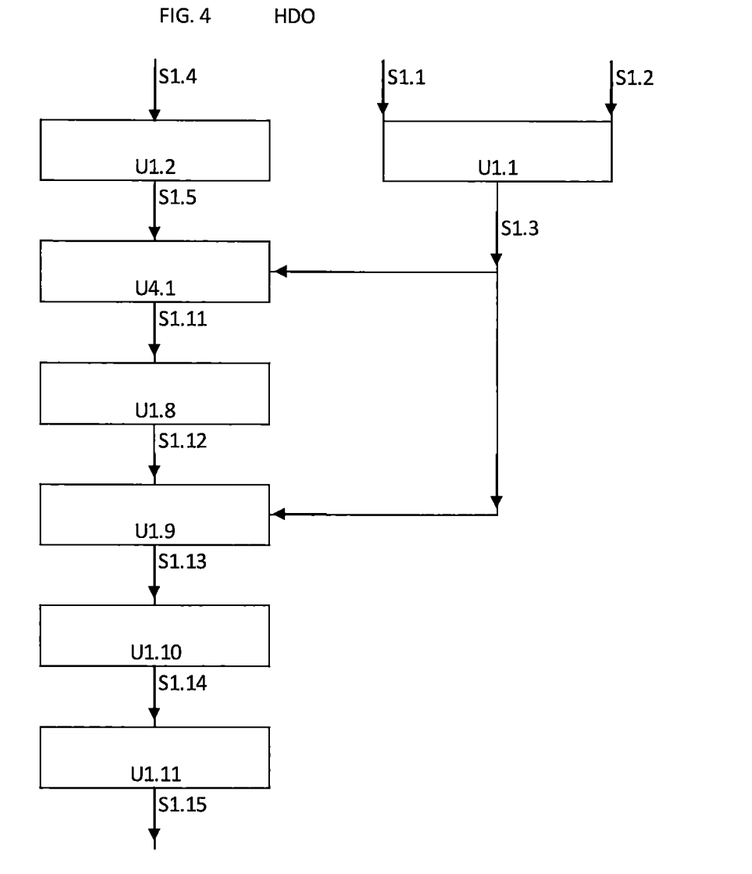
FIG. 4 shows the integrated process of hydroprocessing fatty acids via hydrodeoxygenation (HDO) reaction using low-carbon hydrogen.

In some embodiments, Unit U1.3 performs the DCOX reaction, as shown in FIG. 2. In some embodiments, Unit U1.3 performs the DCON reaction, as shown in FIG. 3. In some embodiments, Unit U1.3 performs the HDO reaction, as shown in FIG. 4. In some embodiments, Unit U1.3 can perform a DCOX, a DCON, and a HDO reaction within one reactor.

In embodiments in which the DCOX reaction occurs, such as in FIG. 2, the hydrotreatment feedstream, S1.5, is sent to unit U2.1, the DCOX reactor which results in two product streams, Stream S2.1, and Stream S1.11. At least a portion of Stream S1.3 comprising hydrogen is blended with the Stream S2.1 comprising carbon dioxide and sent to unit U2.2, the reverse water shift (RWGS) reactor used in the eFuels production process. Carbon dioxide and hydrogen are reacted in the RWGS reactor to carbon monoxide and water in an RWGS reactor, often with excess hydrogen, where the heat of reaction is provided by a RWGS heater. The catalyst used in the RWGS reactor is a catalyst as referenced in the published application U.S. Ser. No. 17/300,260.

At least a portion of Stream S2.2 (RWGS Product stream) which comprises hydrogen and carbon monoxide becomes the Liquid Fuel Production (LFP) reactor or F-T reactor feed. The RWGS Product, comprising carbon monoxide and with the possible addition of extra hydrogen, is reacted to fuels and chemicals in a Liquid Fuels Production (LFP) reactor or F-T reactor, unit U2.3 that uses a catalyst to produce long chain hydrocarbons that are used as fuels and chemicals. The final product is water and a hydrocarbon mixture where the majority (e.g., 51 volume percent to 99 volume percent) of hydrocarbons in the mixture are hydrocarbons from about 5 to about 24 carbon atoms in length.

In embodiments in which the DCON reaction occurs, such as in FIG. 3, the hydrotreatment feedstream, S1.5, is sent to unit U3.1, the DCON reactor which results in two product streams, Stream S3.1, and Stream S1.11. At least a portion of Stream S1.3 comprising hydrogen is blended with Stream S3.1 comprising carbon monoxide and becomes the Liquid Fuel Production (LFP) reactor or F-T reactor feed. The stream comprising carbon monoxide and with the possible addition of extra hydrogen, is reacted to fuels and chemicals in a Liquid Fuels Production (LFP) reactor or F-T reactor that uses a catalyst to produce long chain hydrocarbons that are used as fuels and chemicals. The final product is hydrocarbon products and water where the majority (e.g., 51 volume percent to about 99 volume percent) of hydrocarbons in the mixture are hydrocarbons to 24 carbon atoms in length. In one embodiment, the F-T produced water with or without water treatment to remove the hydrocarbons and other impurities is used as a feedstock to the electrolyzer.

The carbon monoxide produced by the DCON reactor is used in various ways. In one embodiment a stream comprising the CO produced by the DCON reactor is processed with or without additional hydrogen as additional feed to the LFP reactor or F-T reactor, unit U3.2. This will result in an increase in the total hydrocarbon fuel that is produced by the LFP or F-T system. In another embodiment, the CO is separated and sold to others.

In another embodiment, the CO that is either sold or used at the integrated facility can be used for hydroformylation. Hydroformylation, also known as oxo synthesis or oxo process, is an industrial process to produce aldehydes (R—CH=O) from alkenes (R2C=CR2). Aldehydes are easily converted into many secondary products. The resulting aldehydes are hydrogenated to alcohols that are converted to detergents. Hydroformylation is also used in specialty chemicals used to make of fragrances and drugs.

The process entails treatment of an alkene typically with high pressures (between 10 and 100 atmospheres) of carbon monoxide and hydrogen at temperatures between 40 and 200° C. Transition metal catalysts are required, the catalyst dissolves in the reaction medium and is an example of homogeneous catalysis.

In some embodiments, the water produced in the LFP reactor is recycled and sent back, with or without treatment, to the electrolyzer, unit U1.1.

The LFP hydrocarbon product stream, S1.6 comprises n-alkanes with carbon numbers from 5 to 24 that is fed to a separation unit, unit U1.4, where at least three products are produced. "Carbon number" refers to the number of carbon atoms in the respective alkane. LFP separation is any separation process absorption, adsorption, filtration, or distillation. Distillation is the preferred separation process. The LFP separation unit produces at least three products. The light LFP separation product comprises n-alkanes with carbon numbers between 5 and 8. The heavy LFP separation product comprises n-alkanes with carbon numbers between 16 and 24. The medium LFP separation product comprises n-alkanes from carbon numbers between 9 and 15. The medium LFP separation product is in the boiling range of synthesized paraffinic kerosene or jet fuel. However, the physical properties of the n-alkane rich medium LFP separation product do not meet the requirements of SPK jet fuel without additional processing.

In another embodiment of the invention, the LFP system described above is replaced with a traditional F-T system that produces a heavy hydrocarbon wax and also lighter liquid products, however the lighter liquid products are a smaller percentage of the overall product steam.

In one embodiment of the invention, at least a portion of the heavy LFP separation unit product is sold as premium low sulfur, high cetane diesel fuel or diesel fuel blendstock. "At least a portion of" means a part of the whole. Nonlimiting examples of "at least a portion" include 5%, 10%, 20%, 30%, 40%, 50%, 60%, 70%, 80%, 90% and 100%.

Stream S1.16 shows recycled water being fed back into the electrolyzer, unit U1.1.

At least a portion of the medium LFP separation product, Stream S1.12, is fed to unit U1.5 or a hydroisomerization unit. In hydroisomerization, the properties of the feedstock are improved by transforming normal alkane hydrocarbons to branched ones having the same carbon numbers. This reaction improves the cold flow properties of the hydrocarbon. The hydroisomerization reaction decreases the pour point, cloud point, cold filter plug point (CFPP) and/or the freezing point of the hydrocarbon stream.

The hydroisomerization reactor is any suitable design but it is preferred that the reactor be a cylindrical reactor with a liquid feed at the top of the reactor. The liquid feed comprising the medium LFP separation product is mixed with Stream S1.3 comprising hydrogen. The combined feed reacts over a catalyst bed in the reactor vessel. Typically, this reactor is a trickle bed reactor. At least a portion of the n-alkanes react across the catalyst to produce branched alkanes. The reactor is comprised of one or more catalyst beds. In some embodiments, additional hydrogen feed is injected between the various catalyst beds. The molar ratio of the hydrogen to liquid hydrocarbon feed ranges from 10 to 300, more preferably between 15 to 30, even more preferably from 19 to 25. The operating pressure of the hydroisomerization reactor is between 10 to 100 bar, more preferably between 20 and 80, and more preferably between 30 and 40. The Weight Hourly Space Velocity (WHSV) is between 0.1 to 10 kg/hr liquid feed/kg catalyst, more preferably between 0.2 and 5 $hr^{-1}$, and more preferably between 0.5 to 2 $hr^{-1}$. The reactor operating temperature from 200° C. to 350° C.

The hydroisomerization catalyst is a solid shaped particle. The catalyst comprises a metal deposited on an acidic support. The catalyst metal in some embodiments is a platinum and palladium that provides hydrogenation and dehydrogenation activity. The catalyst metal in some embodiments comprises nickel. The catalyst metal in some embodiments comprises copper. In some embodiments that catalyst metal comprises a bimetallic such as Ni—Cu, Ni—Mo, Pt—Fe, and Pt—Be. The acidic support is chosen from any suitable support and includes supports comprising ZSM-5, ZSM-22, ZSM-23, Silica, Alumina, $SiO_2$—$Al_2O_3$, Beta zeolite, MCM-41, MCM-48, SBA-15 and includes blends of such supports.

The conversion of n-alkane to branched alkane in the hydroisomerization reactor is preferably between 50 and 100%, and more preferably from 80 to 100% and may require recycling feeds to achieve these conversions. The reactor temperature, pressure, hydrogen to n-alkane ratio, and weight hourly space velocity (WHSV) is manipulated to maintain a high conversion of n-alkane conversion to branched alkanes.

In some embodiments of the invention, at least a portion of the light LFP separation unit product comprising a mixture of alkanes and alkenes is fed to an oligomerization reactor to produce an oligomerization product. At least a portion of Product Stream S1.13 is fed back to the LFP Separation Unit (unit U1.4) or any other separation type vessel or unit operation.

The light LFP separation unit product comprises a mixture of n-alkanes and n-alkenes. The alkene/alkane ratio in the stream is controlled by changes in the LFP reactor operating conditions. Lower hydrogen to carbon monoxide ratios in the LFP reactor feed and higher LFP reactor temperature favors the production of n-alkenes over n-alkanes. The alkenes react with each other and produce a product that is in the kerosene boiling range.

In one embodiment, CO2 is a by-product of the of the HEFA hydro treater reactor (U1.3) and also of the hydroisomerization reactor (U1.5). In several embodiments, the U1.3 and U1.5 product streams comprise CO2. The CO2 in the product stream is captured by a CO2 capture system. The capture system can use any available technology including amine and solvent based systems, membranes, or CO2 fractionation, or other methods known in the art.

FIG. 4 shows an integrated process for the production of synthesized paraffinic kerosene or jet fuel and/or renewable diesel using an HDO reaction scheme. Stream S1.1 is low carbon electricity. Low carbon electricity includes but is not limited to wind power, solar power nuclear power, geothermal, power generated from biomass or renewable natural gas, and hydropower. Feed stream S1.2 is water. These are fed to unit U1.1 which is the electrolyzer. In the electrolyzer, water and low or no carbon electricity are used to produce hydrogen and oxygen. Water is fed to the electrolyzer. The electrolyzer is powered by low carbon electricity. Hydrogen is produced by electrolysis of water.

$$H_2O = H_2 + \frac{1}{2}O_2$$

The products from the electrolyzer are a stream comprising hydrogen called stream S1.3. Due to the use of renewable energy sources, the electrolyzer produces "green" hydrogen. Depending on the carbon-intensity of energy used in unit U1.1, other low carbon hydrogen streams are produced.

In FIG. 1, stream S1.4 which comprises the renewable animal and/or vegetable feedstock and includes materials such as seed oils, palm oils, corn oils, soybean oils, distillers corn oil, other virgin oils, and also includes waste oils, used cooking oils, tallow, methyl esters, Stream S1.4 is pretreated in unit U1.2. unit U1.2 comprises multiple processes that are used depending on the feedstock use and the contaminants that are in the feedstocks. This includes acid degumming, adsorption, chloride removal, polyethylene removal, and caustic or deacidification processes.

The product of pretreating the HEFA is shown as stream S1.5 and is then sent to the hydrotreatment reactor, unit U4.1. Unit U4.1 is where the HDO reaction scheme takes place, FIG. 4. Green hydrogen from stream S1.3 is added to unit U4.1. Two separate hydrocarbons are produced in unit U4.1. HDO reaction schemes produce hydrocarbons and those hydrocarbons become stream S1.11.

The light LFP separation unit product comprises a mixture of n-alkanes and n-alkenes. The alkene/alkane ratio in the stream is controlled by changes in the LFP reactor operating conditions. Lower hydrogen to carbon monoxide ratios in the LFP reactor feed and higher LFP reactor temperature favors the production of n-alkenes over n-alkanes. The alkenes react with each other and produce a product that is in the kerosene boiling range.

Figure 5:
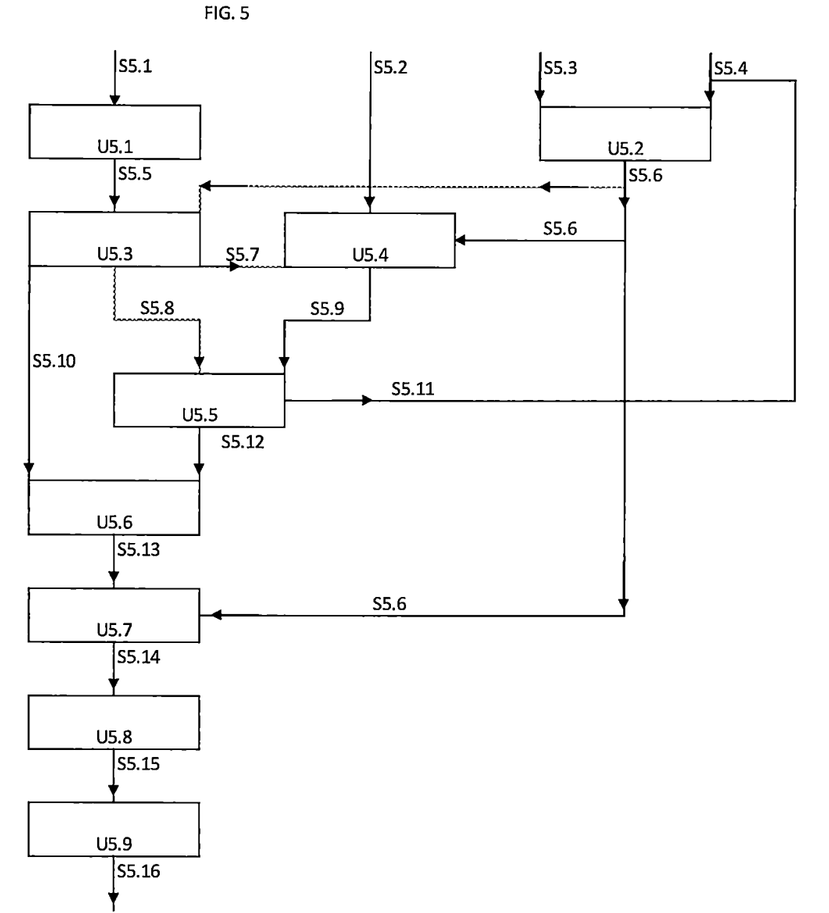
FIG. 5 shows the integrated process that includes the bringing CO2 from other sources into the overall process to increase fuel production.

In some embodiments, additional CO2 is supplied into the system, see FIG. 5. In these embodiments, in addition to: renewable fats, oils, greases, tallow (stream S5.1); low carbon electricity (stream S5.3); and water (stream S5.4); CO2 (stream S5.2) is added as a feed stream. Carbon dioxide is obtained from several sources and/or from the HEFA process. Power plants that generate electricity from various carbonaceous resources produce large amounts of carbon dioxide. Industrial manufacturing plants that produce ammonia for fertilizer produce large amounts of carbon dioxide. Ethanol plants that convert corn or wheat into ethanol produce large amounts of carbon dioxide via fermentation. Other industrial fermentation processes also produce large amounts of carbon dioxide. Municipal sewage treatment systems using aerobic and anaerobic digestion of sludge produce large amounts of $CO_2$. Utilization or conversion of $CO_2$, as described herein, typically involves separating and purifying the $CO_2$ from a gaseous stream where the $CO_2$ is not the major component (e.g., exhaust flue gas). Typically, an alkylamine is used to remove the carbon dioxide from the gas stream. Alkylamines used in the process include monoethanolamine, diethanolamine, methydiethanolamine, disopropylamine, aminoethoxyethnol, or combinations thereof. Metal Organic Framework (MOF) materials have also been used as a means of separating carbon dioxide from a dilute stream using chemisorption or physisorption to capture the carbon dioxide from the stream. Other methods to get concentrated carbon dioxide include chemical looping combustion where a circulating metal oxide material captures the carbon dioxide produced during the combustion process. Carbon dioxide is also captured from the atmosphere in what is called direct air capture (DAC). The processes for the capture of carbon dioxide often involve regeneration of the capture materials. Alkylamines are regenerated by being heated, typically by low pressure steam.

Captured carbon dioxide which is converted into useful products such as fuels (e.g., diesel fuel, gasoline blend stocks, jet fuel, other) and chemicals (e.g. solvents, olefins, alcohols, aromatics, other), displace fuels and chemicals produced from fossil sources such as petroleum and natural gas, lower the total net emissions of carbon dioxide into the atmosphere. This is what is meant by low carbon, very low carbon, zero carbon, or negative carbon fuels and chemicals.

The carbon dioxide streams that come from industrial or biological processes, or is captured from the atmosphere, or that is available from a commercial carbon dioxide pipeline is not pure carbon dioxide. These available carbon dioxide streams from industrial facilities or pipelines contain sulfur containing compounds from none to 2000 parts per million by weight and also contain hydrocarbons from none to 10 volume percent. Purification of the carbon dioxide including the removal of sulfur containing compounds and hydrocarbons is necessary to avoid issues with downstream processing. After purification, the purified carbon dioxide is suitable for the generation of low carbon or zero-carbon fuels and chemicals.

In these embodiments, the added CO2 is added to the RWGS reactor (unit U5.4) to produce additional CO. This is in addition to the CO2 produced via the hydrotreatment process (unit U5.3) when the DCOX reaction scheme is used. As with previous embodiments, hydrogen is supplied to the RWGS reactor (unit U5.4), the hydroisomerization reactor (unit U5.7), and the hydrotreatment reactor (unit U5.3) when the HDO reaction scheme is used, via electrolyzer (unit U5.2).

By supplying additional CO2, more CO is produced and fed into the LFP reactor or traditional F-T reactor that produces a high percentage of wax (unit U5.5). This is in addition to the CO produced via hydrotreatment (stream S5.8) when the DCON reaction scheme is used. This creates even more hydrocarbons (stream S5.12), which is in addition to the hydrocarbons produced via hydrotreatment. These hydrocarbons are fed into the separation unit (U5.6) as with previous embodiments. As with previous embodiments, the product stream, S5.13 containing the separated hydrocarbons, is fed into a hydroisomerization reactor, unit U5.7. This produces stream S5.14, and is fed into unit U5.8, the hydroisomerization separator. As with previous embodiments, this produces stream S5.15, which is fed to the refining unit, U5.9, which produces the product stream S5.16. Leftover water from U5.5 can be recycled as stream S5.11 and returned to the electrolyzer, U5.2.

The invention claimed is:

1. A process for the production of renewable fuels comprising:
   a. using low carbon electricity in an electrolyzer to convert an electrolyzer feedstock into a first electrolyzer product stream comprising low carbon hydrogen and a second electrolyzer product stream comprising oxygen, wherein the electrolyzer feedstock comprises water;
   b. pretreating biomass to provide hydroprocessed esters and fatty acids, wherein the biomass comprises at least one of the following materials, seed oils, palm oils, corn oils, soybean oils, distillers corn oil, other virgin oils, waste oils, used cooking oils, tallow and methyl esters;
   c. feeding the hydroprocessed esters and fatty acids into a hydrotreatment reactor that produces liquid fuel, wherein a first hydrocarbon stream and a second hydrocarbon stream are produced, wherein the first hydrocarbon stream comprises C9-C15 n-alkanes, and wherein the second hydrocarbon stream comprises alkenes, and wherein the C9-C15 n-alkanes and the alkenes comprise between 40 volume percent and 99 volume percent of the liquid fuel;
   d. feeding at least a portion of the first hydrocarbon stream and at least a portion of the first electrolyzer product stream to at least one catalytic hydroisomerization unit to produce one or more hydroisomerization product streams that are fed to a hydroisomerization separation unit, wherein the hydroisomerization separation unit produces two or more hydroisomerization products.

2. The process of claim 1, wherein the hydrotreatment reactor comprises a decarboxylation reactor that produces a hydrocarbon stream and a carbon dioxide stream, and wherein the process further comprises feeding the carbon dioxide stream and a portion of the first electrolyzer product stream to a reverse water gas swift reactor to produce a reverse water gas shift product stream, wherein the reverse water gas shift product stream comprises CO, and wherein the reverse water gas shift product stream is fed to an LFP reactor or F-T reactor to produce hydrocarbons.

3. The process of claim 1, wherein the hydrotreatment reactor comprises a decarbonylation reactor that produces a hydrocarbon stream and a water and CO stream, and wherein the process further comprises feeding the water and CO stream to an LFP reactor or F-T reactor to produce hydrocarbons.

4. The process of claim 1, wherein one or more of the hydroisomerization product streams meets an ASTM standard, and wherein the ASTM standard is ASTM D7566-21.

5. The process of claim 1, wherein one or more of the hydroisomerization streams meets an ASTM standard, and wherein the ASTM standard is ASTM D975.

6. The process of claim 1, wherein a hydrodeoxygenation reaction is performed in the hydrotreatment reactor.

7. The process of claim 1, wherein a decarboxylation reaction is performed in the hydrotreatment reactor.

8. The process of claim 1, wherein a decarbonylation reaction is performed in the hydrotreatment reactor.

9. The process of claim 1, wherein the biomass is selected front a group of biomasses, and wherein the group consists of: seed oils, palm oils, corn oils, soybean oils, distillers corn oil, waste oils, used cooking oils, tallow and methyl esters.

10. The process of claim 1, wherein pretreating biomass comprises acid degumming, adsorption, chloride removal, polyethylene removal, caustic processes or deacidification processes.

11. The process of claim 1, wherein the catalytic hydroisomerization reactors, and wherein the hydroisomerization reactors are cylindrical, trickle bed reactors with a liquid feed at the top of the reactors.

12. The process of claim 1, wherein the hydroisomerization reactors comprise a catalyst, and wherein the catalyst comprises a metal deposited on an acidic support, and wherein the metal is selected from a group of metals consisting of platinum, palladium, nickel, Ni—Cu, Ni—Mo, Pt—Fe and Pt—Be, and wherein the acidic support is selected from a group of acidic supports consisting of ZSM-5, ZSM-22, ZSM-23, Silica, Alumina, SiO2-Al2O3, Beta zeolite, MCM-41, MCM-48, SBA-15 and blends of the acidic supports.

13. The process of claim 6, wherein the biomass is selected from a group of biomasses, and wherein the group consists of: seed oils, palm oils, corn oils, soybean oils, distillers corn oil, waste oils, used cooking oils, tallow, and methyl esters, and wherein pretreating biomass comprises acid degumming, adsorption, chloride removal, polyethylene removal, caustic processes, or deacidification processes.

14. The process of claim 7, wherein the biomass is selected from a group of biomasses, and wherein the group consists of: seed oils, palm oils, corn oils, soybean oils, distillers corn oil, waste oils, used cooking oils, and wherein pretreating biomass comprises acid degumming, adsorption, chloride removal, polyethylene removal, caustic processes, or deacidification processes.

15. The process of claim 8, wherein the biomass is selected from a group of biomasses, and wherein the group consists of: seed oils, palm oils, corn oils, soybean oils, distillers corn oil, waste oils, used cooking oils, tallow, and methyl esters, and wherein pretreating biomass comprises acid degumming, adsorption, chloride removal, polyethylene removal, caustic processes, or deacidification processes.

16. The process of claim 13, wherein the catalytic hydroisomerization units comprise hydroisomerization reactors, and wherein the hydroisomerization reactors are cylindrical, trickle bed reactors with a liquid feed at the top of the reactors, and wherein the hydroisomerization reactors comprise a catalyst, and wherein the catalyst comprises a metal deposited on an acidic support, and wherein the metal is selected from a group of metals consisting of platinum, palladium, nickel Ni—Cu, Ni—Mo, Pt—Fe and Pt—Be, and wherein the acidic support is selected from a group of acidic-supports consisting of ZSM-5, ZSM-22, ZSM-23, Silica, Alumina, SiO2-Al2O3, Beta zeolite, MCM-41, MCM-48, SBA-15 and blends of the acidic supports.

17. The process of claim 14, wherein the catalytic hydroisomerization units comprise hydroisomerization reactors, and wherein the hydroisomerization reactors are cylindrical, trickle bed reactors with a liquid feed at the top of the reactors, and wherein the hydroisomerization reactors comprise a catalyst, and wherein the catalyst comprises a metal deposited on an acidic support, and wherein the metal is selected from a group of metals consisting of platinum, palladium, nickel, Ni—Cu, Ni—Mo, Pt—Fe and Pt—Be, and wherein the acidic support is selected from a group of acidic supports consisting of ZSM-5, ZSM-22, ZSM-23, Silica, Alumina, SiO2-Al2O3, Beta zeolite, MCM-41, MCM-48, SBA-15 and blends of the acidic supports.

18. The process of claim 15, wherein the catalytic hydroisomerization units comprise hydroisomerization reactors, and wherein the hydroisomerization reactors are cylindrical, trickle bed reactors with a liquid feed at the top of the reactors, and wherein the hydroisomerization reactors comprise a catalyst, and wherein the catalyst comprises a metal deposited on an acidic support, and wherein the metal is selected from a group of metals consisting of platinum, palladium, nickel, Ni—Cu, Ni—Mo, Pt—Fe and Pt—Be, and wherein the acidic support is selected from a group of acidic supports consisting of ZSM-5, ZSM-22, ZSM-23, Silica, Alumina, SiO2-Al2O3, Beta zeolite, MCM-41, MCM-48, SBA-15 and blends of the acidic supports.

19. The process of claim 2, wherein a third hydrocarbon stream is produced by the hydrotreatment reactor, and wherein the third hydrocarbon stream comprises C1-C4 product gases.

20. The process of claim 19, wherein the third hydrocarbon stream is fed into an electrically heated steam methane reformer.

21. The process of claim 19, wherein the third hydrocarbon stream is fed into an autothermal reformer unit.

22. The process of claim 19, wherein the third hydrocarbon stream is recycled to the reverse water gas shift reactor.

* * * * *